R. G. STANDERWICK.
TURBINE DRIVEN SET.
APPLICATION FILED AUG. 20, 1918.
1,337,098. Patented Apr. 13, 1920.
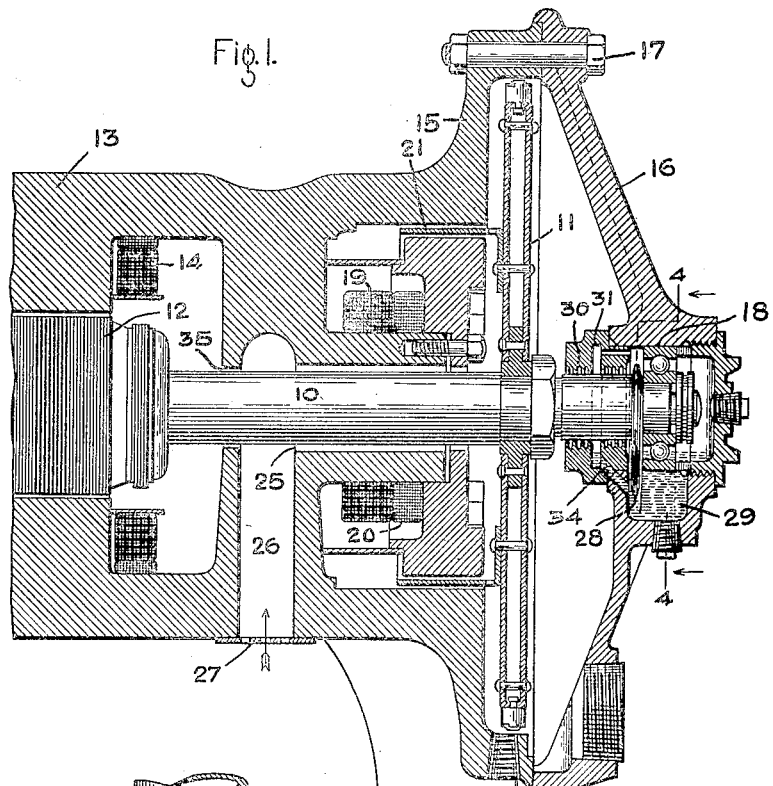
Fig. 1.
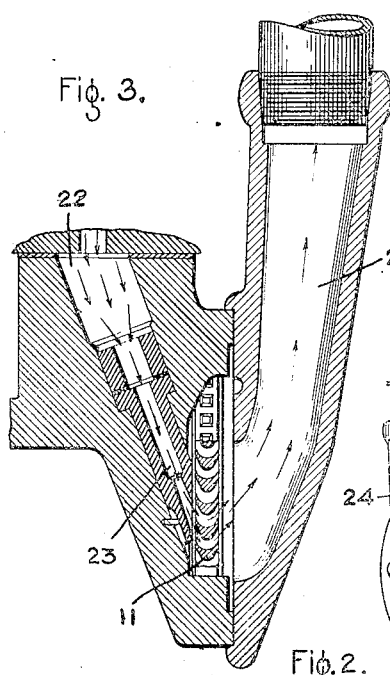
Fig. 3.
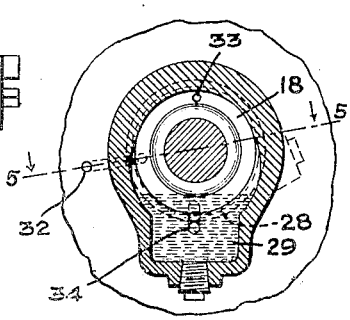
Fig. 5.
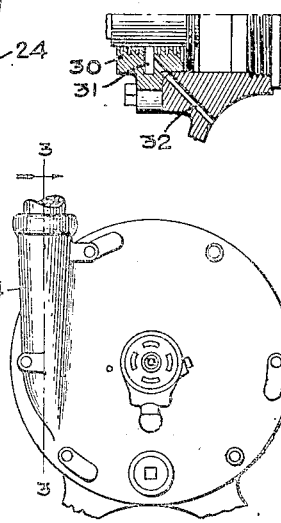
Fig. 4.
Fig. 2.
Inventor,
Reginald G. Standerwick,
by
His Attorney

UNITED STATES PATENT OFFICE.

REGINALD G. STANDERWICK, OF LYNN, MASSACHUSETTS, ASSIGNOR TO GENERAL ELECTRIC COMPANY, A CORPORATION OF NEW YORK.

TURBINE-DRIVEN SET.

1,337,098.  Specification of Letters Patent.  Patented Apr. 13, 1920.

Application filed August 20, 1918. Serial No. 250,724.

*To all whom it may concern:*

Be it known that I, REGINALD G. STANDERWICK, a citizen of the United States, residing at Lynn, in the county of Essex, State of Massachusetts, have invented certain new and useful Improvements in Turbine-Driven Sets, of which the following is a specification.

The present invention relates to turbine driven sets and has for its object generally to provide an improved structure in such sets.

For a consideration of what I believe to be novel and my invention attention is directed to the accompanying specification and claims appended thereto.

In the drawing Figure 1 is a longitudinal sectional view of a portion of a turbine driven set embodying my invention; Fig. 2 is an end elevation thereof; Fig. 3 is a section taken on line 3—3, Fig. 2; Fig. 4 is a section taken on line 4—4 Fig. 1, and Fig. 5 is a section taken on line 5—5 Fig. 4.

In the present instance my invention is illustrated in connection with a small turbine driven generator such as is well adapted for use as a headlight set on a steam locomotive. 10 indicates a shaft upon which is mounted a turbine wheel 11 and an armature 12 of a generator. The casings of the generator and turbine are formed as an integral structure, 13 indicating the generator casing carrying the field winding 14, and 15 indicating the turbine casing. The turbine casing has a front plate 16 held in place by bolts 17 and in the front plate is a bearing 18 for one end of shaft 10. The set shown is of a two bearing type, there being one bearing at each end of the shaft. The generator is shown as being partly broken away so the bearing at the generator end does not show in the drawing. It will be understood, however, that it may be of any suitable type. At 19 and 20 are two windings which in conjunction with a disk 21 carried by turbine wheel 11 form a magnetic braking mechanism which mechanism consumes more or less electrical energy thus generating heat. Elastic fluid is conveyed to the turbine wheel 11 by a conduit 22 which terminates in a nozzle 23 which discharges elastic fluid directly against the buckets of the wheel. In the present instance there is only a single nozzle but it will be understood that more than one may be used if found desirable. Elastic fluid after having performed work on the turbine wheel exhausts through the exhaust conduit 24. The exhaust conduit 24 is so shaped that it produces an ejector effect and it is placed in such relation to the nozzle 23 that the elastic fluid on leaving the turbine buckets discharges directly into it. It is important to place the entrance of the exhaust conduit directly opposite the steam issuing from the buckets since in this manner the residual velocity of the steam is utilized in the ejector. Also it prevents steam from filling the turbine casing where it would have a tendency to enter the bearing and condense, the condensate floating the oil out of the bearing, a thing which has been the source of much trouble in prior constructions.

The action of the ejector is well illustrated by the arrows in Fig. 3. The construction of a conduit to produce an ejector effect is well understood the same being provided with a converging portion which converts pressure into velocity and a diverging portion which converts velocity into pressure and as a result of this arrangement there is maintained in the turbine casing a pressure less than atmospheric. This gives the turbine the benefit of a lower exhaust pressure and I also utilize the existence of this region of lower pressure in the turbine casing for creating a draft of air to cool the windings 19 and 20 of the magnetic braking mechanism. To this end I provide an annular space 25 between the turbine shaft and the core of magnetic braking mechanism and connect such space to atmosphere by an opening 26 which may be covered with a suitable screen 27 to keep out dirt or other foreign matter. With this arrangement there will be a continuous draft of air drawn through opening 26 and annular space 25 to the turbine casing from which the air will be discharged due to the ejector action of the exhaust conduit 24.

Bearing 18 is illustrated as being of the roller type and it is lubricated by an oil ring 28 which dips down into an oil reservoir 29. Owing to the fact that inside the turbine casing is a region of lower pressure there is a tendency for lubricant to leak from the bearing into the turbine casing due to suction. To prevent such leakage I provide a labyrinth packing 30 comprising two sections between which is an annular chamber 31, and I connect chamber 31 to atmosphere by an opening 32 (Figs. 4 and 5) and to the space directly adjacent the bearing by an opening 33 (Figs. 1 and 4). I also connect such chamber by an opening 34 to reservoir 29. By this arrangement the pressure in chamber 31 is always equal to atmospheric pressure and is the same as that in the space adjacent the bearing and in reservoir 29. As a result lubricant which leaks to chamber 31 will flow back to reservoir 29 by way of opening 34 which forms in substance a drain opening.

In addition to reducing the temperature of the parts of the magnetic brake by causing a current of air to flow over them my improved construction also serves to reduce the temperature of the generator. To this end the opening 35 in the generator casing through which the shaft 10 extends is made somewhat larger than the shaft. On the commutator end of the generator there are suitable openings through which air enters, and due to the lower pressure in the turbine casing a certain amount of air will flow through the generator over the windings and through the opening 35 where it mixes with air from the passage 26. From this point the air flows through the passage 25 to the turbine casing. The flow of air through the passage 26 also tends to cool the generator casing. The passage of air through the parts as described results in a relatively cool zone between the turbine and generator, the effect of which is to prevent the free transmission of heat from the former to the latter. I have described my invention as adapted to cool both the generator and the braking mechanism but my invention is not limited to cooling both.

By the above described arrangement, it will be seen that I utilize the exhaust steam to create a vacuum in the turbine casing and that I then utilize said vacuum to create a draft over parts which it is desired to cool. It will, of course, be understood that the parts to be cooled may be any existing parts which require cooling. By this means I obtain the benefit of a lower exhaust pressure and also create a draft with the expenditure of no energy other than that contained in the exhaust steam.

Another and very important feature resides in the elimination of any steam in the turbine casing which would leak through the labyrinth packing into the oil chamber thereby causing the condensate to float out the oil and permit the bearings to be destroyed. In the past this has been the source of much trouble and expense which due to my construction have been overcome.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. The combination with an elastic fluid turbine and apparatus associated therewith which generates heat, of means for utilizing the exhaust gases from the turbine for creating in the turbine casing a region of pressure lower than atmosphere, and means forming a passage through which air passes over said apparatus to the turbine casing.

2. The combination with an elastic fluid turbine and apparatus associated therewith which generates heat, of nozzle means which conveys elastic fluid to the turbine, an exhaust conduit opposite the nozzle means, said conduit being shaped to produce an ejector action whereby the pressure in the turbine casing is maintained below atmospheric pressure, and means forming a passage which leads from the atmosphere over said apparatus to the turbine casing.

3. The combination with an elastic fluid turbine comprising a bearing, lubricating means therefor, and means for maintaining in the turbine casing a pressure lower than atmospheric, of means for preventing lubricant leaking from the bearing to the turbine casing comprising two packing members with a chamber between them, said chamber being connected by openings to atmosphere and to the region adjacent the bearing, and means for draining lubricant from said chamber.

4. The combination with an elastic fluid turbine and apparatus associated therewith which generates heat, of means for utilizing the exhaust gases from the turbine for creating in the turbine casing a region of pressure lower than atmospheric, means forming a passage through which air passes over said apparatus to the turbine casing, a bearing adjacent the turbine casing, lubricating means therefor, and means for preventing lubricant leaking from the bearing to the turbine casing comprising two packing members with a chamber between them, said chamber being connected by openings to atmosphere and to the region adjacent the bearing.

In witness whereof I have hereunto set my hand this 17th day of August, 1918.

REGINALD G. STANDERWICK.